(12) United States Patent
Maruyama

(10) Patent No.: US 6,241,198 B1
(45) Date of Patent: Jun. 5, 2001

(54) HOLDING ELEMENT FOR PIPES AND THE LIKE

(75) Inventor: Toshio Maruyama, Aichi (JP)

(73) Assignee: Emhart Inc., Newark, DE (US)

( * ) Notice: Subject to any disclaimer, the term of this patent is extended or adjusted under 35 U.S.C. 154(b) by 0 days.

(21) Appl. No.: 09/338,697

(22) Filed: Jun. 23, 1999

(30) Foreign Application Priority Data

Jul. 3, 1998 (JP) .................................................. 10-188811

(51) Int. Cl.⁷ ...................................................... F16L 3/00
(52) U.S. Cl. ................................ 248/49; 248/68.1; 248/73
(58) Field of Search .............................. 248/49, 68.1, 65, 248/67.7, 71, 73

(56) References Cited

U.S. PATENT DOCUMENTS

| | | | | |
|---|---|---|---|---|
| 4,840,333 | * | 6/1989 | Nakayama | 248/68.1 |
| 5,002,243 | * | 3/1991 | Kraus et al. | 248/68.1 |
| 5,209,441 | * | 5/1993 | Satoh | 248/74.2 |
| 5,460,342 | * | 10/1995 | Dore et al. | 248/74.2 |
| 5,464,179 | * | 11/1995 | Ruckwardt | 248/68.1 |
| 5,588,683 | * | 12/1996 | Schliessner | 285/62 |
| 5,607,126 | * | 3/1997 | Cordola et al. | 248/68.1 |
| 5,947,426 | * | 9/1999 | Kraus | 248/74.2 |
| 5,954,300 | * | 9/1999 | Sturies et al. | 248/68.1 |
| 6,152,406 | * | 11/2000 | Denndou | 248/68.1 |

* cited by examiner

Primary Examiner—Anita M. King
Assistant Examiner—N. Morrison
(74) Attorney, Agent, or Firm—Edward D. Murphy

(57) ABSTRACT

To provide a holding element for pipes and the like with good vibration screening ability between the holding base and the holding parts of pipes and the like, and wherein there is little marked difference in vibration screening ability of the holding parts when a plurality of holding parts are arranged in a row.

A holding element for pipes and the like comprises a base and pipe holding parts held on this base. A pipe holding part comprises: a bent wall pipe forming a concave part for receiving elongate articles such as pipes and the like, inwardly directed convex parts formed with a separation in the circumferential direction on the inside wall face of this bent wall, and a resilient holding element extending diagonally in the direction of this concave part from the tip of the bent wall or the vicinity thereof The pipe holding part is joined to and supported by the base through a hollow pipe-shaped cushion, the tip of the bent wall of the pipe holding part being joined through a thin flexible joining element to a wall integral with the adjacent base, or to a bent wall of an adjacent pipe holding part.

6 Claims, 4 Drawing Sheets

HOLDING ELEMENT FOR PIPES AND THE LIKE

BACKGROUND OF THE INVENTION

This invention relates to a holding element for holding articles of elongate shape such as pipes or wire harnesses on a member such as an automobile body.

Support structures for mounting elongate articles such as automobile fuel pipes or brake pipes or wire harnesses on a vehicle body should preferably have vibration-absorbing ability in order to prevent vehicle body vibration being transmitted to the pipe etc. Conventionally, with the object of such vibration-prevention, the method generally adopted was to effect mounting on a holding element with an anti-vibration rubber element wound around the pipe etc. Since this method is laborious, it is desirable to give the holding element itself anti-vibration characteristics. With this in view, Laid-Open Japanese Patent Publication No. H.9-250517 teaches conferring resilience on a holding element for a pipe etc. by making it of a construction in which hard resin and soft resin are joined. However, with this construction, there are the problems that the construction of the metal mould becomes complicated and, depending on the method of moulding, the number of manufacturing steps is increased and, furthermore, since two types of material are employed, manufacturing costs are increased.

In contrast, U.S. Pat. No. 5,458,303 discloses a construction constituting a holding clip suitable for pipes and the like for holding fuel pipes, in which a hollow part that confers a cushioning action on a pipe holding part is provided, this pipe holding part being joined to a holding base through a resilient joining element. Also, U.S. Pat. No. 5,588,683 discloses a similar clip for a pipe in which a pipe holding part is joined to a support body through a hollow part. All these clips are designed with the aim of preventing to the utmost extent transmission of vibration from the vehicle body etc. to the pipe when an elongate article such as a pipe is supported. The holding clip for pipes for example disclosed in U.S. Pat. No. 5,458,303, due to constructional limitations, is restricted as to the number of holding parts such as pipes that can be provided; the limit in the embodiment of this publication is the provision of one pipe holding part, making a total of two, on each side of the supporting base. In the case of the holding clip for pipes and the like disclosed in U.S. Pat. No. 5,588,683, a construction is shown in which four pipe holding parts are arranged in a row; however, there can be a marked difference in regard to vibration screening ability between the pipe holding parts in the middle of the row and pipe holding parts at the ends of the row.

SUMMARY OF THE INVENTION

The problem to be solved by the present invention is the provision of a holding element for pipes and the like of a construction wherein the vibration screening ability between the holding base and holding part for pipes and the like is good and, in addition, when a plurality of holding parts are arranged in a row and there is no marked difference in the vibration screening abilities of these holding parts.

In order to solve the above problem, a holding element for pipes and the like according to the invention comprises a base and pipe holding parts supported on this base. The pipe holding parts comprise a bent wall forming a concave part for receiving elongate articles such as pipes, convex parts directed inwardly formed with a separation in the circumferential direction on the inside wall face of this bent wall, and a resilient holding element extending diagonally in the direction of said concave part from the tip of the bent wall or the vicinity thereof The pipe holding part is joined to the base through a hollow pipe-shaped cushion, and the tip of the bent wall of the pipe holding part is joined to a wall integral with the adjacent base or to a bent wall of an adjacent pipe holding part through a flexible thin joining element.

In a preferred embodiment of the invention, the base of the holding element for pipes and the like is provided with an elongate bottom part and upright parts erected from both ends of this bottom part. A plurality of pipe holding parts are supported on this base, being arranged with a separation along the length direction of the base. Respective pipe holding parts are provided with a bent wall forming a concave part for receiving an elongate article such as a pipe, inwardly directed convex parts formed with a separation in the circumferential direction on the inside wall face of this bent wall, and a resilient holding element extending diagonally in the direction of the concave part from the tip of the bent wall or the vicinity thereof Respective pipe holding parts are joined to and supported by said base through a hollow pipe-shaped cushion. The tip of the bent wall nearest this upright part of the pipe holding part adjacent the upright part of the base is joined to this upright part through a resilient thin element, the tip of the bent wall on the other side being joined to the tip of the bent wall of the adjacent pipe holding part through a flexible resilient thin part.

Preferably, in putting the invention into practice, the cushion is made of elliptical cross-section and a convex part providing a stop to restrict the stroke of flexure of the pipe holding part is formed on the inside wall face of the cushion. Also, preferably, the cushion is joined to the respective pipe holding part and base by supporting pillars of small diameter.

DETAILED DESCRIPTION OF THE INVENTION

Figure 1:
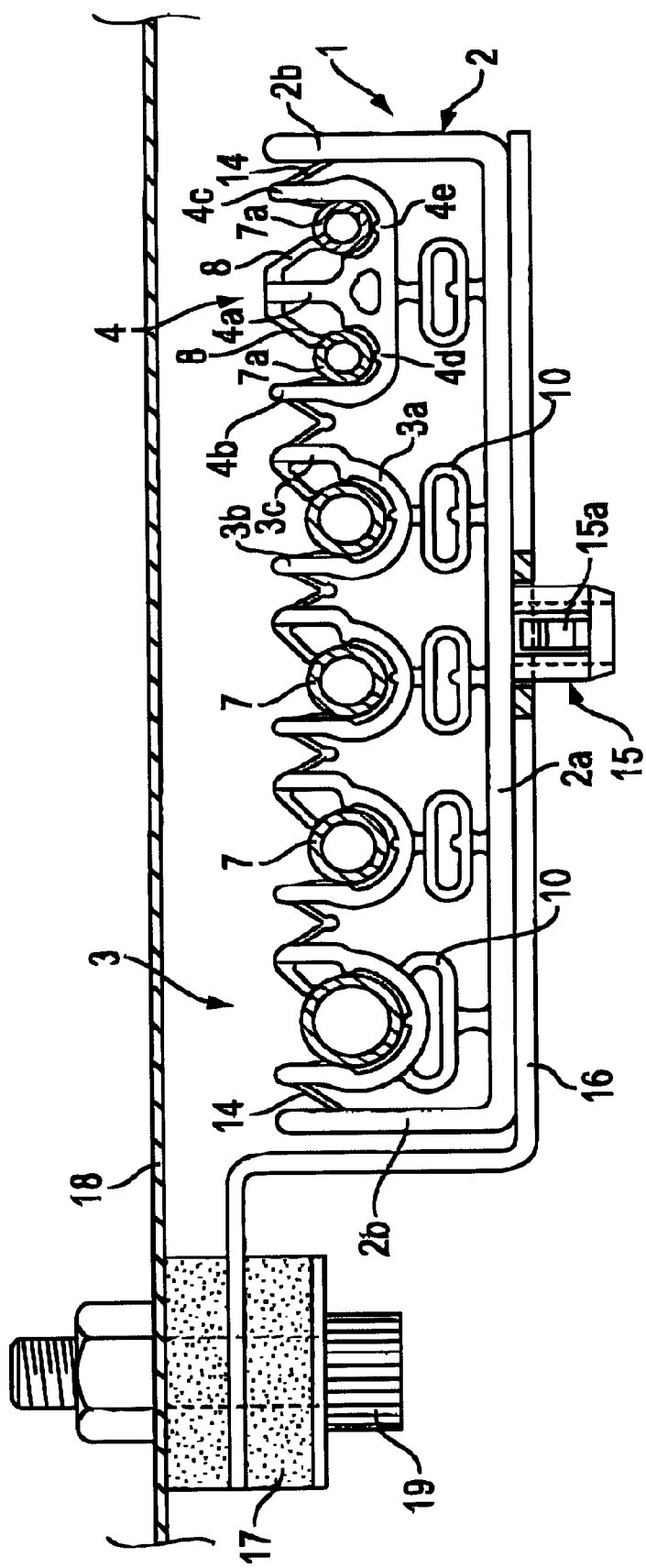
FIG. 1 is a front view showing a clip for pipe holding according to an embodiment of the FIG. 2 is a front view showing part of the clip shown in FIG. 1 to a larger scale.

Embodiments of the invention are described below with reference to the drawings. FIG. 1 shows a holding clip for a pipe etc. according to a first embodiment of the invention; clip 1 comprises an elongate bottom part 2a and upright parts 2b extending in erect manner from both ends of this bottom part 2a. A plurality of pipe holding parts 3, 4 are arranged in a row in the lengthwise direction of elongate bottom part 2a of base 2. A first pipe holding part 3 is designed so as to support a single pipe; in this embodiment there are provided four first pipe holding parts 3. A second pipe holding part 4 is designed to hold two pipes; in this embodiment, there is provided a single second pipe holding part 4.

Figure 2:
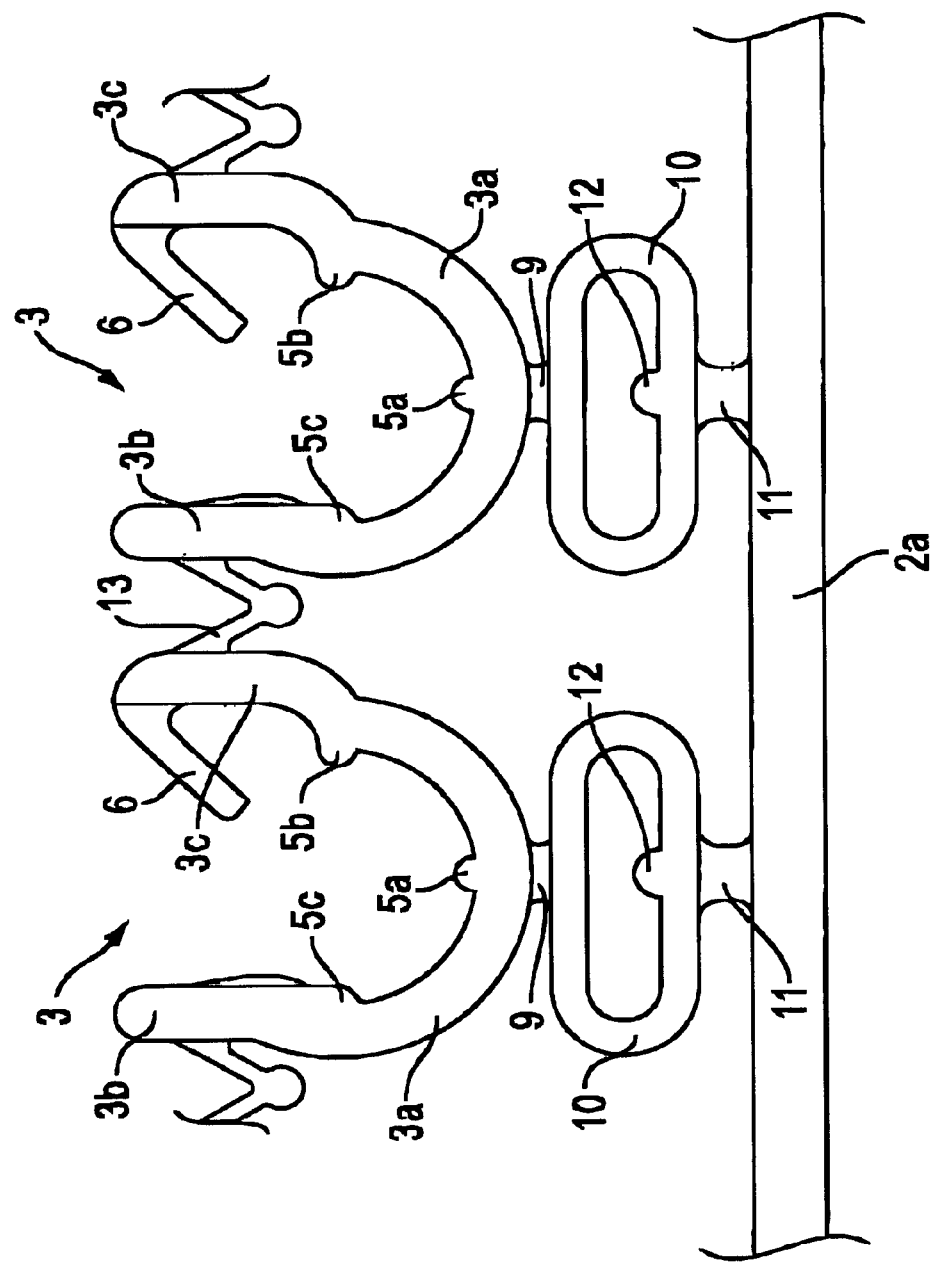

Referring to FIG. 2, first pipe holding part 3 comprises: a pipe holding body 3a of semicircular cross-section, a first upright wall 3b standing erect at one end of this holding body 3a, and a second upright wall 3c standing erect from the other end of this holding body 3a, in the upwards direction, at a position slightly offset therefrom in the laterally outwards direction. A holding projection 5a that projects in the radially inwards direction is formed in the middle in the circumferential direction of the inside face of holding body 3a. In addition, a holding projection 5b likewise inwardly directed is formed on holding body 3a on the inside face of the boundary with second upright wall 3c. First upright wall 3b has its inside face offset inwards from the inside face of holding body 3a, so that a step 5c is formed on the inside face between this first upright wall 3b and holding body 3a. A resilient holding element 6 extending diagonally inwards is formed at the outside end of second upright wall 3c.

As shown in FIG. 1, a pipe 7 is held within this first pipe holding part 3 with its underside and both sides in the lateral direction of its circumferential surface received within first pipe holding part 3 in a condition in which these contact projections 5a, 5b and step 5c, the upper side of its circumferential surface being restrained by resilient holding element 6.

Second pipe holding part 4 is constructed so as to hold two pipes 7a of smaller diameter than pipe 7 held in first pipe holding part 3 parallel to each other, being formed with an upright wall 4a that is erected at its centre, and being formed with upright walls 4b, 4c erected at both ends. Between central upright wall 4a and upright walls 4b, 4c at both ends, there are formed respective pipe holding structures 4d, 4e. Since their shape is practically the same as in the construction of first pipe holding part 3, detailed description thereof is omitted. On both sides of the upper end of central upright wall 4a, there are formed resilient holding elements 8 extending diagonally downwards towards respective pipe holding structures 4d, 4e.

Referring once more to FIG. 2, the outside under-surface of holding body 3a of first pipe holding part 3 is joined to a hollow pipe-shaped cushion 10 through a supporting pillar 9. The underside of cushion 10 is joined to bottom part 2a of base 2 through a supporting pillar 11. On the inside face of the bottom wall of hollow pipe-shaped cushion 10, there is formed a convex part 12 constituting a projection-shaped stop in the middle thereof. As shown in FIG. 1, second pipe holding part 4 is joined to bottom part 2a of base 2 through supporting pillars 9, 11 and hollow pipe-shaped cushion 10 of identical construction.

As best shown in FIG. 2, two adjacent first pipe holding parts 3 are mutually joined by a thin joining element 13 bent in V shape. Joining element 13 is integrally connected with the upper end of upright wall 3b of one pipe holding part 3 and the upper end of the upright wall 3c of another pipe holding part 3. As shown in FIG. 1, the upright wall 4b of the pipe holding part 3 that is furthest on the outside of the row of first pipe holding parts 3 is joined through a resilient thin element 14 to one upright wall 2b of base 2. As shown in FIG. 1, the upright wall 4c of the pipe holding part 3 which is the innermost of the row of first pipe holding parts 3 is joined by means of a V-shaped thin joining element 13 to upright wall 4b of second pipe holding part 4. Upright wall 4c of second pipe holding part 4 is joined through resilient thin element 14 to the other upright wall 2b of base 2. It should be noted that, in this embodiment, the outermost holding body 3a of pipe holding part 3 of the row of first pipe holding parts 3 is joined directly to pipe-shaped cushions 10 without the intervention of a support pillar 9.

On the under-surface in the middle in the length direction of bottom part 2a of base 2, there is provided a mounting foot 15 provided on both sides with resilient claw elements 15a of the same shape as the known anchor-type resilient claw elements. Clip 1 of the construction described above is integrally formed of plastics material. Clip 1 is mounted on a mounting bracket 16 by insertion of mounting foot 15 in a hole formed in mounting bracket 16. Mounting bracket 16 is mounted on a panel 18 such as an automobile body panel by means of a bolt 19 through a resilient bush 17.

Since, in this holding clip for elongate articles such as pipes, the respective pipe holding parts 3, 4 are supported on the base by means of hollow pipe-shaped cushions 10, these cushions 10 provide a buffering effect in regard to vibration in the vertical direction. Also, in regard to vibration in the transverse direction, transmission of vibration from panel 18 to pipe holding parts 3, 4 can be greatly alleviated by the buffering effect provided by the V-shaped thin resilient joining elements 13 and resilient thin elements 14. Also, the concave parts 5a, 5b and step 5c formed on pipe holding parts 3, 4 support pipe 7 by point contact. Due to this holding by point contact, vibration can be better dispersed than in the case of holding by contact over the entire face; the vibration alleviating effect is thereby increased.

Also, the support structure for clip 1 using a bracket 16 of the type supported on one side as shown in the drawing, in conjunction with the use of resilient bush 17, further raises the vibration-alleviating effect.

Figure 3:
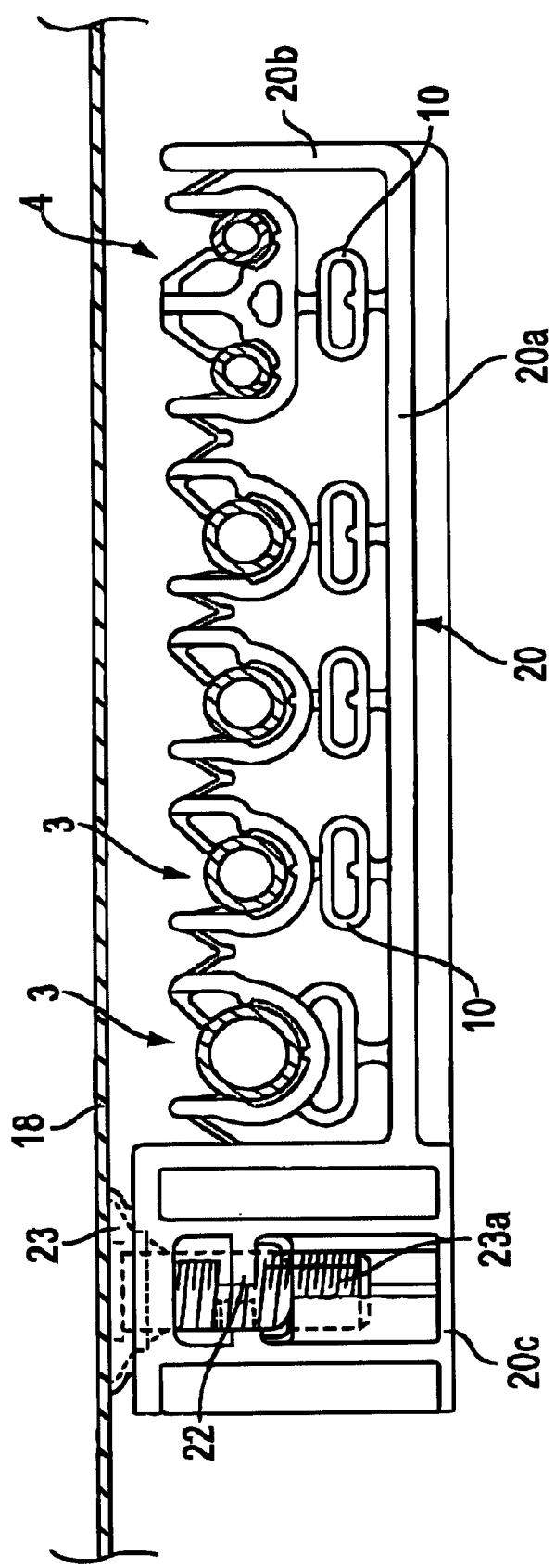
FIG. 3 is a front view showing a clip for pipe holding according to another embodiment of the invention.
Figure 4:
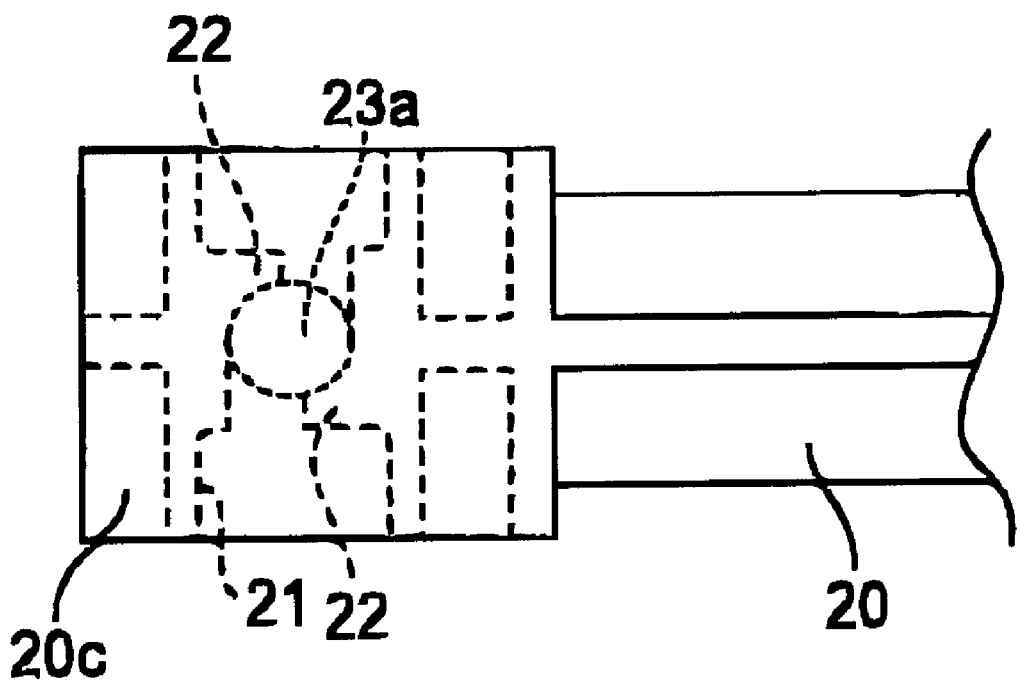
FIG. 4 is a partial bottom face view showing the mounting structure of the clip base according to the embodiment of FIG. 3.

FIG. 3 and FIG. 4 show a further embodiment of this invention; parts corresponding to the construction of the embodiment described above are given the same reference symbols and further detailed description thereof is omitted. In this embodiment, the construction of the individual pipe holding parts 3, 4 is the same as in the case of the embodiment shown in FIG. 1 and FIG. 2. Pipe holding parts 3, 4 are supported on base 20 through respective hollow pipe-shaped cushions 10. The construction of cushions 10 is the same as in the case of the previous embodiment.

Base 20 is provided with an elongate bottom part 20a and an upright part 20b is provided at one end of this bottom part 20a. This upright part 20b corresponds to upright parts 2b of the embodiment described above. A mounting part 20c is formed at the other end of bottom part 20a of base 20. As shown in FIG. 4, this mounting part 20c is of rectangular block shape, provided with a through-hole 21 in the vertical direction in its interior. Engagement claws 22 are formed in through-hole 21. A suction plate 23 having engagement claws (not shown) that engage with these engagement claws 22 on shaft 23a is mounted in this mounting part 20c by insertion of this shaft 23a in through-hole 21 of mounting part 20c. Suction plate 23 is mounted on panel 18.

The action of the clip shown in FIG. 3 and FIG. 4 is identical with the action of the clip shown in FIG. 1 and FIG. 2.

What is claimed is:

1. A holding assembly connected to a mounting bracket that is affixed to a panel for resiliently holding a plurality of elongated articles, the holding assembly comprising:

a. a base having an elongated bottom part and upright parts erected from both ends of the bottom part;

b. a plurality of elongated article holding parts supported on and disposed along the length direction of the base;

c. each of the holding parts having oppositely facing, concavely shaped, bent walls adapted to receive one of the elongated articles therein;

d. each of the bent walls having an inside face and an outside face;

e. a plurality of holding projections formed on the inside face of each of the bent walls a predetermined distance from each other;

f. a plurality of resilient holding elements extending diagonally in the direction of the base to resiliently join the outside face of each of the bent walls and the upright parts of the base adjacent the upper ends of both the bent walls and the upright parts; and g. a plurality of hollow substantially elliptical shaped cushions to resiliently connect each of the bent walls of the holding parts to the base.

2. The combination claimed in claim 1 wherein:

a. a single elongated article holding part is provided with concavely shaped bent walls for receiving two elongated articles therein.

3. The combination claimed in claim 1 wherein:

a. a plurality of joining feet are connected between each of the elliptical shaped cushions and the elongated bottom part.

4. The combination claimed in claim 3 wherein:

a. a joining foot is connectable between the outer surface of the bent walls and the elliptical shaped cushions.

5. The combination claimed in claim 1 wherein:

a. the elliptical cushion has a cross-section that will collapse at a predetermined distance during vibrations of the elongated articles to provide a stop that restricts the movement of the elongated article.

6. The combination claimed in claim 3 wherein:

a. each of the joining feet defines a support pillar having a small diameter.

* * * * *